United States Patent
Wang (10) Patent No.: US 7,336,323 B2
(45) Date of Patent: Feb. 26, 2008

(54) LIQUID CRYSTAL FILTER WITH TUNABLE REJECTION BAND

(75) Inventor: Xinghua Wang, Pittsburgh, PA (US)

(73) Assignee: ChemImage Corporation, Pittsburgh, PA (US)

( * ) Notice: Subject to any disclaimer, the term of this patent is extended or adjusted under 35 U.S.C. 154(b) by 0 days.

(21) Appl. No.: 11/534,912

(22) Filed: Sep. 25, 2006

(65) Prior Publication Data
US 2007/0070260 A1    Mar. 29, 2007

Related U.S. Application Data

(60) Provisional application No. 60/720,782, filed on Sep. 27, 2005.

(51) Int. Cl.
*G02F 1/1335* (2006.01)

(52) U.S. Cl. .......... 349/18; 359/246; 359/253; 359/256; 359/259

(58) Field of Classification Search .......... 349/18
See application file for complete search history.

(56) References Cited

U.S. PATENT DOCUMENTS

| | | | |
|---|---|---|---|
| 3,647,279 A | 3/1972 | Sharpless et al. | |
| 4,197,008 A | 4/1980 | Pinnow et al. | |
| 4,394,069 A | 7/1983 | Kaye | |
| 4,848,877 A | 7/1989 | Miller | |
| 5,247,378 A | 9/1993 | Miller | |
| 5,387,920 A | 2/1995 | Bos et al. | |
| 5,483,387 A * | 1/1996 | Bauhahn et al. ............ | 359/885 |
| 5,689,317 A | 11/1997 | Miller | |
| 5,892,612 A | 4/1999 | Miller et al. | |
| 5,943,129 A | 8/1999 | Hoyt et al. | |
| 5,953,083 A | 9/1999 | Sharp | |
| 5,953,087 A | 9/1999 | Hoyt | |
| 6,028,656 A | 2/2000 | Buhrer et al. | |
| 6,172,722 B1 * | 1/2001 | Sharp .......................... | 349/80 |
| 6,310,673 B1 | 10/2001 | Sharp | |
| 6,373,568 B1 | 4/2002 | Miller et al. | |
| 6,373,614 B1 | 4/2002 | Miller | |

(Continued)

FOREIGN PATENT DOCUMENTS

WO    WO 00/74384    12/2000

(Continued)

OTHER PUBLICATIONS

Wu, "Design of a liquid crystal based electrooptic filter". Applied Optics, vol. 28, No. 1 pp. 48-52 (1989).

(Continued)

*Primary Examiner*—Michael H. Caley
(74) *Attorney, Agent, or Firm*—Duane Morris LLP (57) ABSTRACT

An optical wavelength filter uses birefringence and polarization to discriminate and block a wavelength stop band. Birefringent elements, each having a fixed retarder and a liquid crystal, are placed along the signal path with the fast and slow axes in each pair being aligned and rotationally displaced from other pairs. The birefringence parts are arranged by their thickness, birefringence and progressive rotational orientation so that each pair contributes to achieving a specific polarization state for specific periodic wavelength discrimination bands. A selection polarizer at the output blocks bands that have this polarization state. The birefringence elements are tuned in a coordinated manner and thereby to select one or more wavelengths as the band stop discrimination band.

20 Claims, 7 Drawing Sheets

U.S. PATENT DOCUMENTS

| | | | |
|---|---|---|---|
| 6,403,947 | B1 | 6/2002 | Hoyt et al. |
| 6,417,892 | B1 | 7/2002 | Sharp et al. |
| 6,421,131 | B1 | 7/2002 | Miller |
| 6,455,861 | B1 | 9/2002 | Hoyt |
| 6,501,548 | B1 | 12/2002 | Oldenbourg |
| 6,527,849 | B2 | 3/2003 | Dry |
| 6,535,257 | B2 | 3/2003 | Miller |
| 6,552,836 | B2 | 4/2003 | Miller |
| 6,566,143 | B2 | 5/2003 | Hoyt |
| 6,665,072 | B2 | 12/2003 | Hoyt |
| 6,674,527 | B2 | 1/2004 | Hoyt |
| 6,690,466 | B2 | 2/2004 | Miller et al. |
| 6,693,710 | B1 | 2/2004 | Hoyt |
| 6,717,706 | B2 | 4/2004 | Miller et al. |
| 6,734,962 | B2 | 5/2004 | Treado et al. |
| 6,750,964 | B2 | 6/2004 | Levenson |
| 6,781,736 | B2 | 8/2004 | Hoyt et al. |
| 6,927,834 | B2 | 8/2005 | Deary |
| 6,985,216 | B2 | 1/2006 | Treado et al. |
| 6,992,809 | B1 | 1/2006 | Wang et al. |
| 6,999,155 | B2 | 2/2006 | Tillin et al. |
| 2001/0033376 | A1 | 10/2001 | Hoyt |
| 2003/0117705 | A1 | 6/2003 | Hoyt |
| 2007/0024779 | A1* | 2/2007 | Sharp ..................... 349/117 |

FOREIGN PATENT DOCUMENTS

| | | |
|---|---|---|
| WO | WO 01/02799 | 1/2001 |
| WO | WO 01/11343 | 2/2001 |
| WO | WO 01/28224 | 4/2001 |
| WO | WO 01/63260 | 8/2001 |
| WO | WO 01/63261 | 8/2001 |
| WO | WO 01/63262 | 8/2001 |
| WO | WO 01/81990 | 11/2001 |
| WO | WO 02/19016 | 3/2002 |
| WO | WO 02/44800 | 6/2002 |
| WO | WO 02/092516 | 11/2002 |

OTHER PUBLICATIONS

Ammann, "Synthesis of Optical Birefringent Networks". Progress in Optics IX pp. 123-177 (1971).

Beckers, et al., "Observing the sun with a fully tunable Lyot-Ohman filter". Applied Optics, vol. 14, No. 9 pp. 2061-2066 (1975).

Call, et al., "Application of a Liquid Crystal Tunable Filter to Near-Infrared Spectral Searches". SETICon02 (2002).

Chu, et al., "Birefringent filter synthesis by use of a digital filter design algorithm". Applied Optics, vol. 41, No. 17 pp. 3412-3418 (2002).

Deng, et al., "Inhomogeneous distribution of brightness in the split-element filter". Applied Optics, vol. 36, No. 7 pp. 1576-1579 (1997).

Evans, "The Birefringent Filter". J. Opt. Soc. Amer., vol. 39, No. 3 pp. 229-242 (1949).

Katzenstein, et al., "Realization of a New Type of Birefringent Filter". Applied Optics, vol. 10, No. 5 pp. 1119-1124 (1971).

Leroy, "Solc Elements in Lyot-Oehman Filters". J. Optics vol. 11, No. 5 pp. 293-304 (1980).

Preuss, et al., "Three-stage birefringent filter tuning smoothly over the visible region theoretical treatment and experimental design". Applied Optics, vol. 19, No. 5 pp. 702-710 (1980).

Saeed, et al., "Multispectrum, spatially addressable polarization interference filter". J. Opt. Soc. Am. A, vol. 19, No. 11 pp. 2301-2312 (2002).

Scheffer, "New multicolor liquid crystal displays that use a twisted nematic electro-optical cell". J. Appl. Phys., vol. 44, No. 11 pp. 4799-4803 (1973).

Shabtay, et al., "Tunable birefringent filters—optimal iterative design". Optics Express, vol. 10, No. 26 pp. 1534-1541 (2002).

Staromlynska, et al., "High-performance tunable filter". Applied Optics, vol. 37, No. 6 pp. 1081-1088 (1998).

Wang, et al., "Optimal design of birefringent filter with a flat-top passband". J. Opt. A: Pure Appl. Opt. 8 pp. 652-656 (2006).

Wu, et al., "Liquid-crystal-based switchable polarizers for sensor protection". Applied Optics, vol. 34, No. 31 pp. 7221-7227 (1995).

Ye, "Liquid-crystal bandpass filter based on the optical rotary dispersion effect". Applied Optics, vol. 34, No. 20 p. 4007-4010 (2004).

Ye, "Low-loss birefringent spectral filters comprising three identical retarders". Applied Optics, vol. 45, No. 31 pp. 8044-8051 (2006).

Ye, "Low-loss tunable filter based on optical rotary dispersion". Applied Optics, vol. 45, No. 6 p. 1162-1168 (2006).

Zhou, et al., "Nearly-off-axis transmissivity of Solc birefringent filters". J. Opt. Soc. Am. A, vol. 20, No. 4 pp. 733-740 (2003).

Yariv, et al. "Optical Waves in Crystals". Chapter 5 (1984).

Title, et al. "Tunable birefringent filters". Opt. Eng. 20, pp. 815-823 (1981).

SOLC. "Birefringent Chain Filters". Opt. Soc. Am. vol. 55, No. 6 pp. 621-625 (1965).

Harris, et al. "Optical Network Synthesis Using Birefringent Crystals". I. Synthesis of Lossless Networks of Equal-Length Crystals. J. Opt. Soc. Am. vol. 54, No. 10 pp. 1267-1279 (1964).

UNKNOWN. "Comptes rendus hebdomadaires des seances de Acadamie des science". pp. 1593-1595 (1933).

* cited by examiner

LIQUID CRYSTAL FILTER WITH TUNABLE REJECTION BAND

CROSS REFERENCE TO RELATED APPLICATION

This application claims the priority of U.S. Provisional Application Ser. No. 60/720,782, filed Sep. 27, 2005.

BACKGROUND

The present disclosure generally concerns optical filters, and more particularly, an optical wavelength band-blocking filter using birefringence and polarization wavelength discrimination techniques.

Optical wavelength filters pass or attenuate light as a function of wavelength of light energy in the signal to be filtered. Various practical applications may benefit from a filter that can selectively tune to a particular wavelength, such as modulation/demodulation devices, imaging apparatus, spectral analyzers, and other devices and techniques.

A filter that passes a selected wavelength band with a high transmission ratio, and attenuates other bands, is considered a band-pass filter. Tuning a band-pass filter to pass a given wavelength band while attenuating energy in unselected wavelength bands is functionally similar to tuning the filter so as to block the unselected bands, except that simply tuning a bandpass filter to a wavelength other than a selected bandpass wavelength does not achieve the result needed in a band stop filter, namely to eliminate the stop band with a high rejection ratio while allowing other bands to be transmitted. The usual filter application involves selecting for a narrow pass band and attenuating the remainder of the spectrum. In the present disclosure, one object is to eliminate a narrow band, termed the "stop band," while preserving transmission in other bands insofar as possible. Eliminating a selected stop band may be useful, for example, to block undesired wavelengths to better enable the reception of other wavelengths.

In an interference type periodic wavelength filter, bands of low attenuation (passbands) and bands of high attenuation (stop bands) alternate at regularly spaced wavelengths due the operation of the filter. If the object is high discrimination of a particular wavelength, a narrow passband or stop band is an asset. Another useful aspect is a wide free spectral range between discriminated bands. A filter parameter known as finesse represents the ratio of the discriminated band width (full band width at half maximum amplitude) to the free spectral range (wavelength span between discriminated bands).

It would be ideal in a band pass filter to have no attenuation in the discriminated pass band and 100% attenuation otherwise. By extension, a stop band filter would ideally have 100% attenuation in the discriminated band and pass the rest of the spectrum without attenuation. This poses some challenges in an interference filter if the physical processes that produce a narrow discrimination band also result in poor free spectral range, and the processes that increase the free spectral range also undesirably increase the width of the discriminated band.

Parent U.S. Pat. No. 6,992,809 discloses a pass band filter wherein a cascade of filter stages includes one or more stages having a transmission spectrum with narrow passbands and one or more other stages having large free spectral range. By cascading, the rejection ratios of the stages are superimposed and multiplied. The passbands that are widely spaced operate to select among the passbands that are narrow but closely spaced. The cascaded filter finesse is the product of the finesse attributes of the stages.

A technique wherein the discrimination bands of one cascaded stage select among the discrimination bands in another cascaded stage may be useful in a band pass application but it may not be possible to achieve a similar benefit in a band stop filter. For example, if a broadband signal is attenuated by a stop band at a given stage, e.g., adjacent to an input, then any overlapping stop band in a later stage cannot narrow the overall stop band. The later stage might broaden the stop band or it might increase the rejection ratio at a particular wavelength, but cannot contribute to improved finesse. This demonstrates an inherent distinction between pass band and stop band filters.

In the case of a band stop filter, an arrangement of cascaded stages, with respectively narrow and widely spaced discrimination bands, would be characterized by a broad stop band and low free spectral range, i.e., the opposite of what is desirable in a high performance filter. Therefore, what is needed is a way to provide multiple stages that contribute a progressively greater distinguishing difference in a physical attribute that can be used as a filter selection criteria, using a robust distinguishing technique.

Two characteristics may be important in the band stop filter, namely, the ability to discriminate between nearby wavelengths, preferably so as to permit selection of a narrow band, and also a high rejection ratio or difference in transmission/attenuation between the pass band and the any other band(s).

What is needed is another way to process a signal to render the stop band clearly distinct from the remainder of the spectrum, in a way that permits an ultimate selection apparatus to separate the stop band exclusively. In a high performance application, another important need is a very high rejection ratio. In an application where the wavelengths to be rejected are high in power level, a robust arrangement is needed that is not prone to overheat.

SUMMARY

In order to discriminate closely and to achieve a narrow spectral bandwidth in a band stop filter, one object is to produce a clear distinction between light energy as a function of wavelength in a spectral range, specifically by imparting a distinct polarization state to wavelengths in the stop band. Another object, then, is to use this polarization state distinction to discriminate sharply for the stop band, i.e., to block light transmission at tunably selected stop bands in the range, having this specific polarization state.

According one embodiment, the polarization state of the input light signal is processed through a succession of tunable birefringence elements. The birefringence elements comprise fixed birefringent retarders, each abutting a tunable liquid crystal retarder, optically aligned thereto and controlled to add a variable retardance to that of the fixed retarder. The birefringence elements are configured by their dimensions and rotational orientations to establish and maintain, through their entire succession, a progression of polarization transformations. The transformations together produce a distinct polarization state in light at the tunable wavelength stop band. Incidentally, the transformations also produce that same polarization state for longer and/or shorter wavelengths that are periodically related to the tunable wavelength. Outside of the stop band or stop bands, wavelengths propagating through the same birefringence elements assume other polarization states.

In one example, the incoming light signal is plane polarized at an input reference angle by passing through a polarization filter. The succession of birefringent elements comprises a first element with orthogonal fast and slow axes at 45° to the reference angle. The first birefringent element differentially retards the vector component of the light signal that is parallel to the slow axis. The differential retardation is a time or distance amount that is not wavelength dependent. This time or distance, however, corresponds to a different phase angle for light at different wavelengths. Therefore, only the discrimination band wavelengths, namely the stop bands that are to be marked with a distinct polarization state, are retarded by a given phase angle.

Each of the subsequent birefringent elements is rotationally displaced from the reference angle to complement the retardation phase angle. Each of the birefringent elements is related in thickness to the other birefringent elements and the birefringent elements are tuned in a coordinated way to maintain the same result through each said birefringent element, namely to impart a predetermined phase retardation specifically to the discrimination band wavelengths only. In this way, each successive birefringent element further contributes to the aspect, namely the distinct polarization state, and the distinct state is used ultimately to separate the discrimination band wavelengths from other wavelengths. Meanwhile, the discrimination wavelength can be selectively tuned. By increasing or decreasing the birefringence of the elements, preferably adjusting the voltage bias to the liquid crystals, the stop band wavelength is adjusted because a different wavelength is then retarded by the given phase angle that is complemented by the coordinated thicknesses and rotational orientations of all the birefringent elements.

There are a number of filter configurations that meet the foregoing requirements and are illustrated hereinafter. The point is that light in the discrimination band (the stop band) when emerging from the last birefringent element has a distinct polarization state that can be discriminated. In one embodiment, the emerging light is plane polarized at an output reference angle. A polarization filter that functions as a selector is arranged orthogonal to the output reference angle, thereby blocking further propagation of the discrimination band (the stop band). The polarization filter used as a selector can be absorptive, or in another embodiment the polarization filter can be reflective, such as a wire grid polarizer.

Wavelengths outside of the stop band propagate through. The periodically related wavelengths that incidentally emerge from the birefringent elements in the same polarization state as the discrimination band also are blocked, but light outside of these bands is transmitted with little attenuation compared to the attenuation of the stop band. Therefore, imaging apparatus, illumination sources and the like can continue to operate through the band-stop filter, even bidirectionally.

One apt use of this subject matter is the defense against laser radiation as a countermeasure or means for attacking imaging and targeting apparatus by overdriving and dazzling sensors of such apparatus with laser radiation intended to disable the sensors and blind the apparatus. This disclosure provides an electrically tunable device that can be tuned quickly to the wavelength of an attacking laser source, optionally using received light amplitude as a negative feedback signal by which the inventive band stop filter homes in on the band stop wavelength that blocks the radiation from transmission through the filter.

Birefringent optical elements impart a shift in polarization state that is a function of wavelength, by inducing differential phase retardation in electromagnetic vector components of the light signal that are parallel to one or the other of the mutually orthogonal fast and slow axes of the birefringent element. The birefringent elements can comprise controllable liquid crystals together with fixed birefringent retarders, connected to be tuned in unison. By varying the birefringence of all the birefringent elements in a stack, the band stop wavelength is tuned. The band-stop wavelength emerges with a high degree of plane polarization specifically for the band-stop wavelength. Out of band light energy is substantially randomly polarized. The polarizing filter, aligned perpendicular to the plane polarized orientation of the band-stop wavelength, substantially completely removes the band-stop wavelength light energy.

In a practical application, the filter according to one embodiment of the present disclosure is useful to block narrowband radiation, for example to block energy in a particular spectral band. In a tactical application, a filter according to disclosed embodiments can protect a remote sensing imaging system from attack by an enemy applying high intensity laser light to the imaging system as a way to blind or destroy the imaging sensor. For this and other applications, the present disclosure provides a band stop filter that can reject the laser light and protect the sensor. Moreover, the sensor and its imaging system may continue to operate when under such an attack using the embodiments discussed herein. The subject filter is tunable to seek the required wavelength in the filter stop band, has a high rejection ratio at the tuned wavelength and a substantial free spectral range so as to pass other wavelengths outside of the stop band. In the embodiments disclosed as examples, the filter is embodied in a robust manner that includes configurations that reflect the incident laser light so as to reduce heat, or absorb the light to defeat targeting attempts using the attacking laser for illumination or target marking.

The foregoing objects are achieved in a filter comprising birefringence elements in a series, each having a fixed birefringence and a tunable birefringence in optical alignment with one another. The birefringence elements are tuned in unison and impart a change in the polarization state of light propagating through the filter. The polarization state varies as a function of wavelength. The birefringence elements are rotationally displaced to complement a particular wavelength band (actually a series of periodically related wavelength bands). As a result, the particular wavelength band (bands) emerge in a distinct polarization state that permits that band to be discriminated from other bands to a very high degree. This particular band is termed the "discrimination band" in this disclosure. It emerges orthogonal to a selection polarizer at the output, thereby blocking the tunably selected stop band at a high rejection ratio, while passing other bands that are not so marked for discrimination, at a relatively high transmission ratio.

Additional objects and aspects will be come apparent from the following discussion of exemplary embodiments.

BRIEF DESCRIPTION OF THE DRAWINGS

It should be understood that the subject matter of this disclosure is capable of embodiment in various specific ways in accordance with the appended claims. The appended drawings and the discussion of examples are intended to be illustrative rather than limiting. In the drawings.

DETAILED DESCRIPTION

The present disclosure generally involves a band stop filter that employs successive tunable birefringent elements cooperating with one or more polarizing filters. Several exemplary embodiments and their transmission spectra are shown in the drawings. Each of the embodiments functions by establishing a light propagation path characterized by a series of wavelength independent differential retardations of vector components of a light signal, through birefringent elements aligned at different rotation angles for respective birefringent elements in the series. Birefringent elements are characterized by different optical indices for vector components of propagating light that are parallel to mutually orthogonal "fast" and "slow" axes of the birefringent element. Therefore, light that propagates through the birefringent element is subjected to differential retardation along those axes.

According to the present disclosure, the successive tunable birefringent elements are configured by their birefringence, thickness and angular orientation, to complement the propagation of a particular wavelength through a predetermined change in polarization state. The predetermined change in polarization state leads up to a polarizing filter that selects or rejects particular wavelength bands.

According to an exemplary embodiment, the filter is arranged to induce a distinct polarization state as a function of wavelength, to incoming light, including the capability of tuning to select wavelengths that are affected. One or more filters responsive to polarization attributes operates to block light having the distinct polarization state. This stops stopping further propagation of the selected wavelength. By propagating through a succession of birefringent elements that are coordinated in birefringence, thickness and orientation, only a series of narrow bands are imparted with the distinct polarization state. According to an inventive aspect, the wavelength bands that are marked by the distinct polarization state are blocked, so as to provide a band stop filter.

Figures 1, 2:
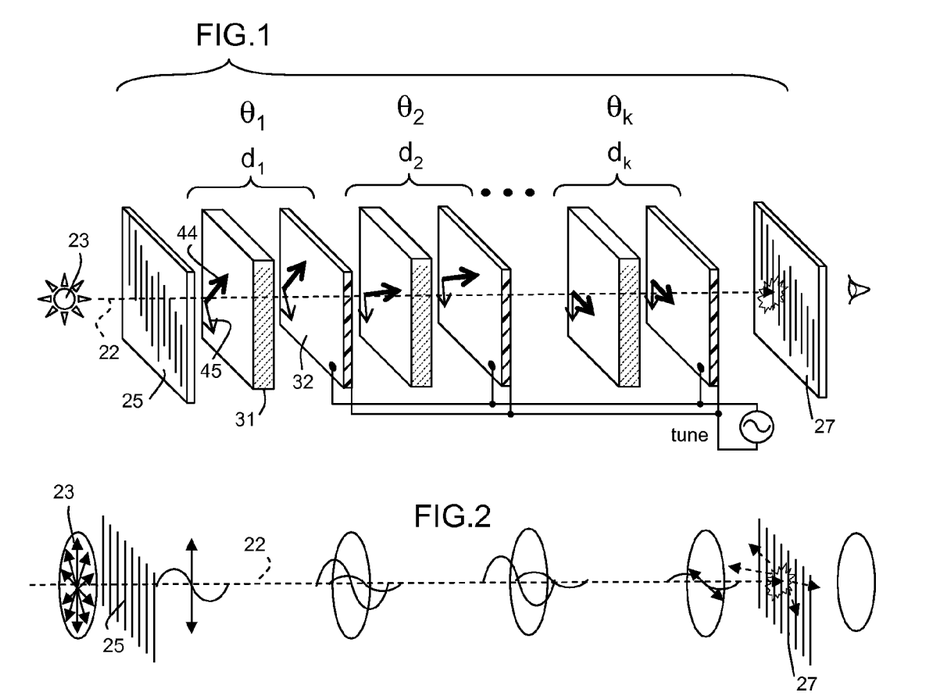
FIG. 1 is a schematic depiction of an embodiment of the filter of the present disclosure, showing an example arranged for propagation of light along a horizontal path from left to right.
FIG. 2 is a spatial projection for explaining the changing polarization characteristics of light energy propagating through the elements shown in FIG. 1.
Figure 3:
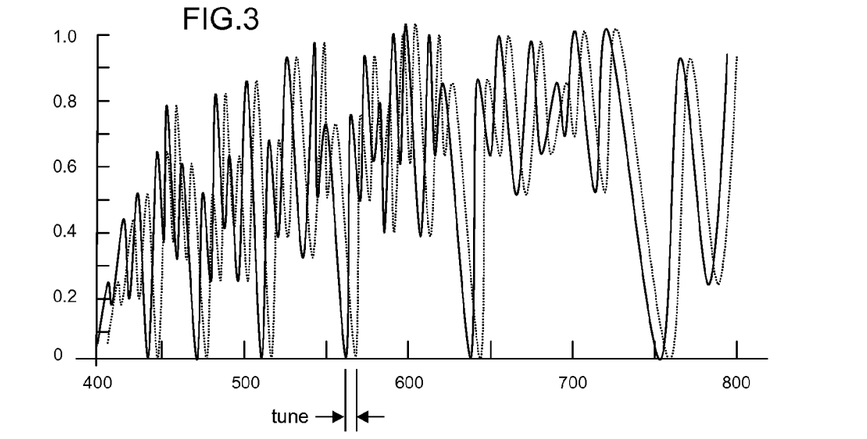
FIG. 3 is a rendered transmission spectrum (not from actual data) showing successive transmission peaks and rejection notches, wherein a broken line represents the spectrum as shifted in wavelength, showing the ability to tune the position of the peaks and notches.

There are a number of structures that can be configured to perform as band stop filters according to the teachings of the present disclosure. A generalized example is illustrated in FIGS. 1 through 3. Light 22 from a source or input 23, is applied to propagate through a succession of birefringent retarders. A fixed retarder 31 and tunably variable retarder 32 is provided in each of the birefringent retarders depicted, the associated fixed and variable retarders 31, 32 in each set being optically aligned with one another at a rotational angle $\theta_n$ and occupying a thickness $d_n$ measured in the direction of light propagation (left to right in FIG. 1). The retarders apply a succession of differential phase retardations that by virtue of the birefringence of their materials and also said angles and thicknesses, so as to complement only the desired wavelength stop band. Only the stop band (and periodically related bands) emerges with a polarization state that can be discriminated, namely treated as a stop band and blocked.

The input light can have any collection of polarization states and alignments, generally shown by source 23 in FIG. 2. The input light also can have any collection of wavelengths. The tunable stop band filter of the present disclosure will stop a tunably selected band, provided that energy at that wavelength is present in the input signal that is permitted to propagate through the filter.

In the embodiment shown in FIG. 1, an input polarizer 25 is shown and is intended to add clarity to this explanation, but in fact an input polarizer is not required. The input polarizer is a polarizing filter that selects and passes those vector components of the incident light 22 that are parallel to the optical orientation of the polarizer plate 25 (shown as vertical), and blocks vector components of the incident light 22 that are perpendicular to the optical orientation of polarizer plate 25. For purposes of explanation, it can be assumed that the light signal 22 as propagating through the filter is plane polarized in a vertical direction upon passing the input polarizer 25.

The light signal 22 is applied to a succession of birefringent retarders, each of which is a composite of at least one fixed retarder 31 and at least one variable retarder 32. The paired fixed and variable members 31, 32 of each such composite birefringent retarder are rotationally oriented the same, so that their respective fast axes 44 are parallel and their respective slow axes 45 are parallel. The fixed and variable members align to the same optical reference angle $\theta_n$.

From one pair 31, 32 to the next, the angles $\theta_1, \theta_2, \ldots \theta_k$ differ so as to correspond to a predetermined phase retardation at the discrimination wavelength, i.e., at the stop band wavelength. In certain embodiments the thicknesses $d_1$ to $d_k$ can differ as well as the angle. However the thickness $d_n$ and the angle $\theta_n$ of each pair 31, 32 is chosen to impart a specific phase retardation to the discrimination wavelength only, so that all of the pairs together cause the discrimination wavelength to emerge from the filter in a planned polarization state and orientation where the stop band can be fully blocked by the output polarizer 27. In the arrangement shown, the plane polarized light at the output of the input polarizer 25 is processed through the birefringent retarders so that the stop band and only the stop band emerges plane polarized at an orientation orthogonal to the output polarizer 27.

In the embodiment of FIG. 1, for example, the fast and slow axes 44, 45 of the initial retarder pair 31, 32, are arranged at an angle $\theta_1$ that is 45° to the orientation of the input polarizer 25. Polarized light from the input polarizer is applied in equal vector components to the respective fast and slow axes of coupled retarder elements 31, 32. The result is to separate the propagating light energy into two components parallel to the respective fast and slow axes. Signal components that are in phase at the input side to the retarder pair 31, 32, emerge from the retarders out of phase. FIG. 2 graphically represents the state of the components emerging from the input polarizer 25, and from each retarder pair.

The slow axis is retarded by a differential delay or distance that at the discrimination band (the stop band) corresponds to a given phase angle. The vector components parallel to the fast and slow axes continue to propagate. However the differential delay of the vector components results in a change of polarization state corresponding to the differential phase retardation. One can envision the plane polarized light being realigned to now complement the next retarder pair 31, 32 at angle $\theta_2$, and so on. The components of the stop band wavelengths experience phase delays at each retarder pair, due to the thicknesses and angles that cause the stop band wavelengths to interfere strongly at the output polarizer 27. The stop band wavelengths emerge from the succession of retarders, all at the same polarization state, shown by a lateral arrow in FIG. 2. The output polarizer 27 selectively blocks the stop band components by virtue of their distinct polarization state aligned perpendicular to the output polarizer. By passing through the coordinated tunable retarder pairs 31, 32, a tunably selected wavelength band is discriminated from other wavelengths because the selected band is imparted with a distinct polarization state, namely a state that cannot pass the output polarizer. The band (or bands) that are imparted with the state that cannot pass the output polarizer are the selected wavelength discrimination band(s) that are the band stop wavelengths as described.

FIG. 3 shows that the spectrum of light energy as a function of wavelength is characterized by distinct peaks, namely wavelengths at which interfering light emerges parallel to the output polarizer 27 and is transmitted, and by distinct notches, where the light is polarized perpendicular to the output polarizer 27 and is blocked. Between the peaks and notches are remaining wavelengths that are attenuated only somewhat. The blocked wavelengths may be reflected or absorbed, depending on the nature of the output polarizer 27.

FIG. 3 shows two transmission functions, displaced by a wavelength difference representing tuning of the variable birefringences of the tunable retarders 32 in the filter. The variable birefringent elements are commonly controlled, for example being liquid crystals coupled to the same control voltage. Adjusting the bias voltage on the variable birefringent elements 32 increases or decreases the birefringence of each pair 31, 32, which is equivalent to making the birefringent elements optically thicker or thinner as a group. Such adjustments change the wavelength at which the birefringences produce the necessary phase retardation to complement the rotational orientations and birefringences of the other paired retarders, shifting the stop band wavelength as shown in FIG. 3.

This filtering technique works to select among wavelengths because birefringence is a matter of optical index and is independent of wavelength, but phase angle and polarization state are functions that vary with wavelength. A differential retardation produced by propagating light through the birefringence can be expressed as a given distance. However, the given distance corresponds to a larger phase angle for a shorter wavelength and a smaller phase angle for a longer wavelength. Thus, the phase angle of retardation produced by propagating light through the birefringent parts varies with wavelength when expressed as a phase angle instead of as a distance.

The stop band and passband nature of the filter is periodic. Longer and shorter wavelengths will have the same polarization state at their respective wavelengths, when the given retardation distance corresponds at the longer or shorter wavelength to the same angle plus or minus an integer multiple of 7 radians. The transfer function has successive notches for a band stop application, or successive peaks for a band pass application.

The successive birefringent elements in sequence along the light transmission path are not parallel but instead are rotationally displaced from one to the next. The rotational displacements are predetermined angles and can be chosen according to one of the known birefringent filter stack configurations such as the Lyot, Lyot-Ohman, Solc and Evans configurations. Certain of these configurations and their transmission spectra when embodied as a stop band filter are shown in FIGS. 4-9.

The fixed retarders 31 can be birefringence elements such as crystal quartz. It is theoretically possible to omit the fixed retarders 31 and employ tunable birefringent parts 32 exclusively, but as a practical matter, at least one fixed retarder 31 is generally needed together with a tunable retarder 32 in each paired set, obtain the necessary birefringence and tunability.

The liquid crystal retarders 32 that are stacked on the fixed retarders affect the refractive index of the whole assembly. In the depicted embodiments, the number of tunable retarders 32 is the same as the number of the fixed retarders 31, in a one-to-one paired correspondence, because each of tunable retarders 32 needs to be rotationally aligned specifically to its pair mate fixed retarder 31, and all the composite pairs 31, 32 need to be adjusted at the same time. This effectively makes a corresponding adjustment in all the pairs at the same time, effectively making them act as if they were thicker or thinner and tuning the whole assembly to a new stop band wavelength. By tuning the liquid crystal retarders (i.e., by "moving" the tuned position of the waveform in FIG. 3 left or right between the position of the solid and dashed line traces shown), the desired band-stop effect can be achieved at a given band-stop wavelength.

One or more of the input polarizer 25 and the output polarizer 27 can be a normal absorbing type polarizer (wherein vector components parallel to the orientation of the polarizer are transmitted and components orthogonal to the orientation of the polarizer are absorbed. It may be desirable if the light energy of the stop band is substantial, to use a wire grid type polarizer or similar other polarizer wherein the rejected wavelengths are reflected. Another alternative is a crystal polarizer.

Figure 4:
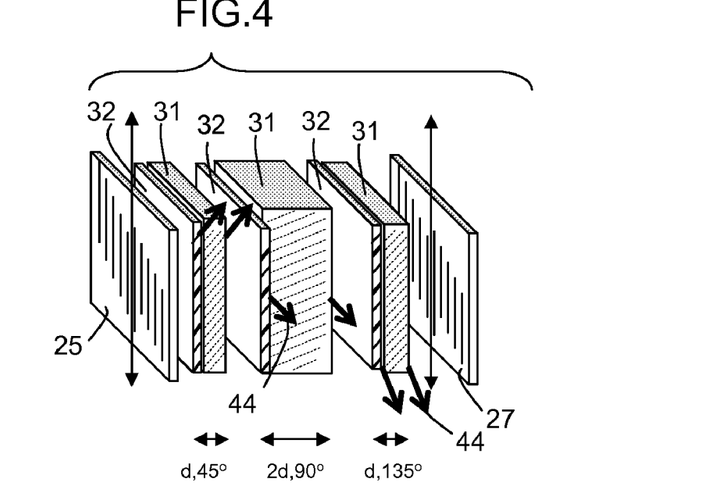
FIG. 4 is a schematic depiction of another filter configuration according to the present disclosure.
Figure 5:
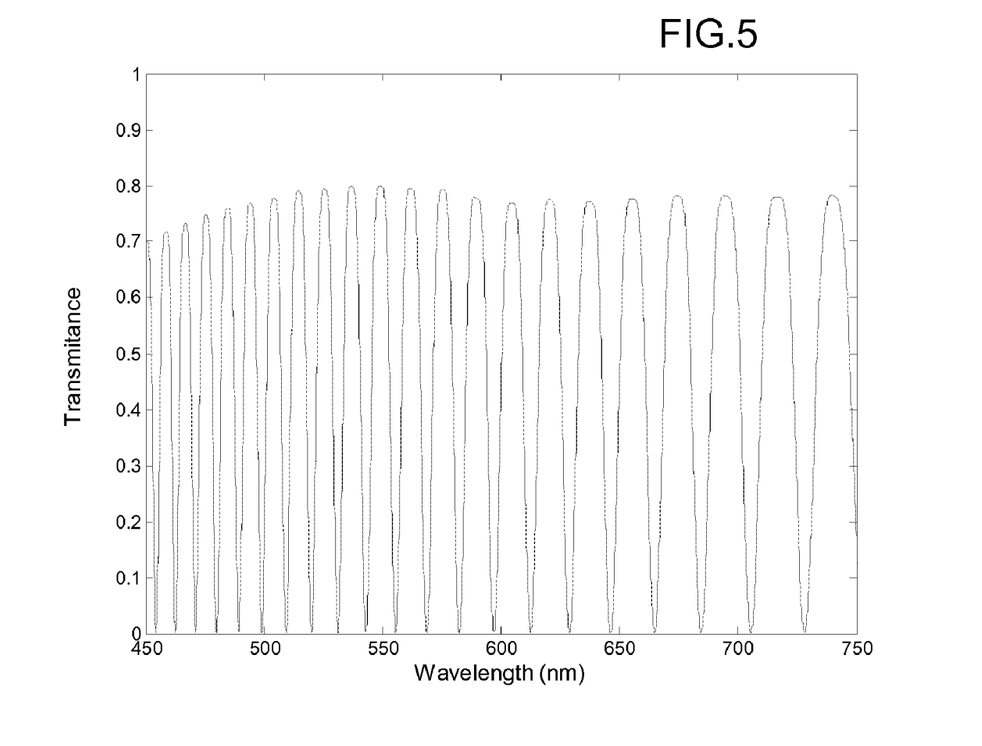
FIG. 5 is a transmission spectrum corresponding to the filter of FIG. 4.
Figure 6:
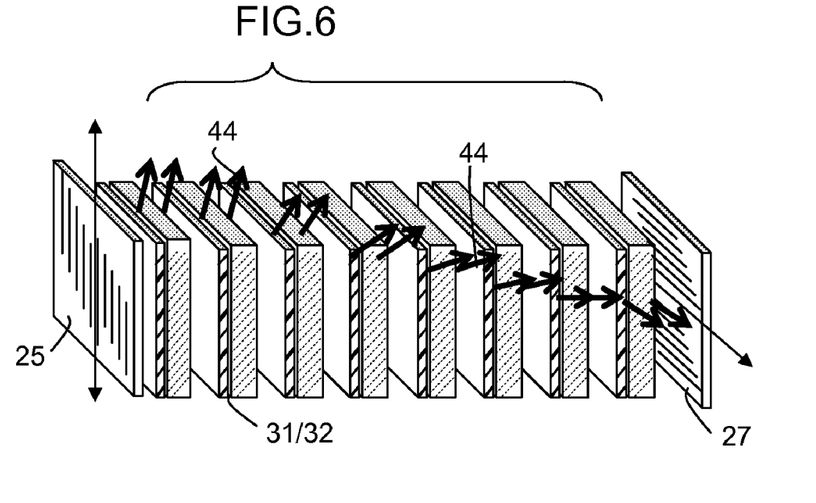
FIG. 6 is a schematic depiction of another filter configuration according to the present disclosure, this embodiment having a fan succession of birefringence element orientations.
Figure 7:
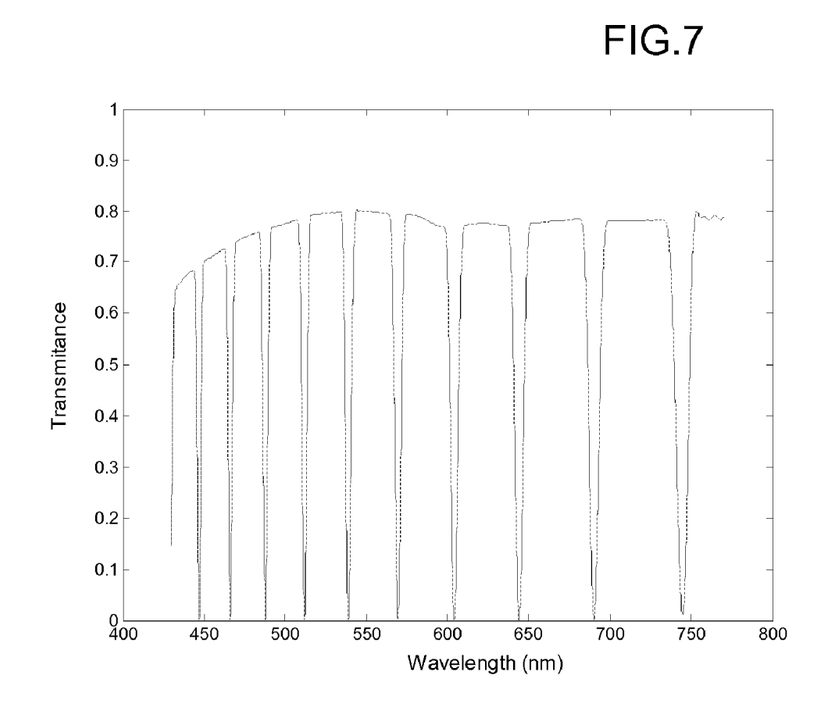
FIG. 7 is a transmission spectrum corresponding to the filter of FIG. 6.
Figure 8:
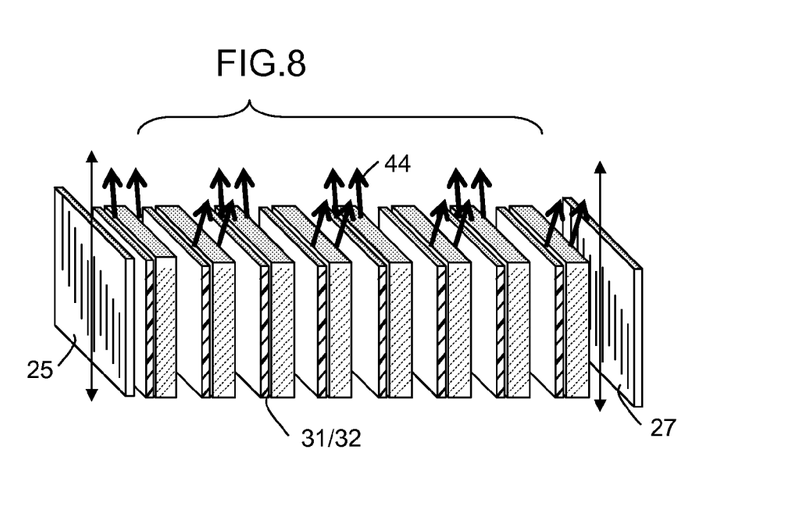
FIG. 8 is a schematic depiction of another filter configuration, this embodiment having a rocking succession of birefringent element orientations.
Figure 9:
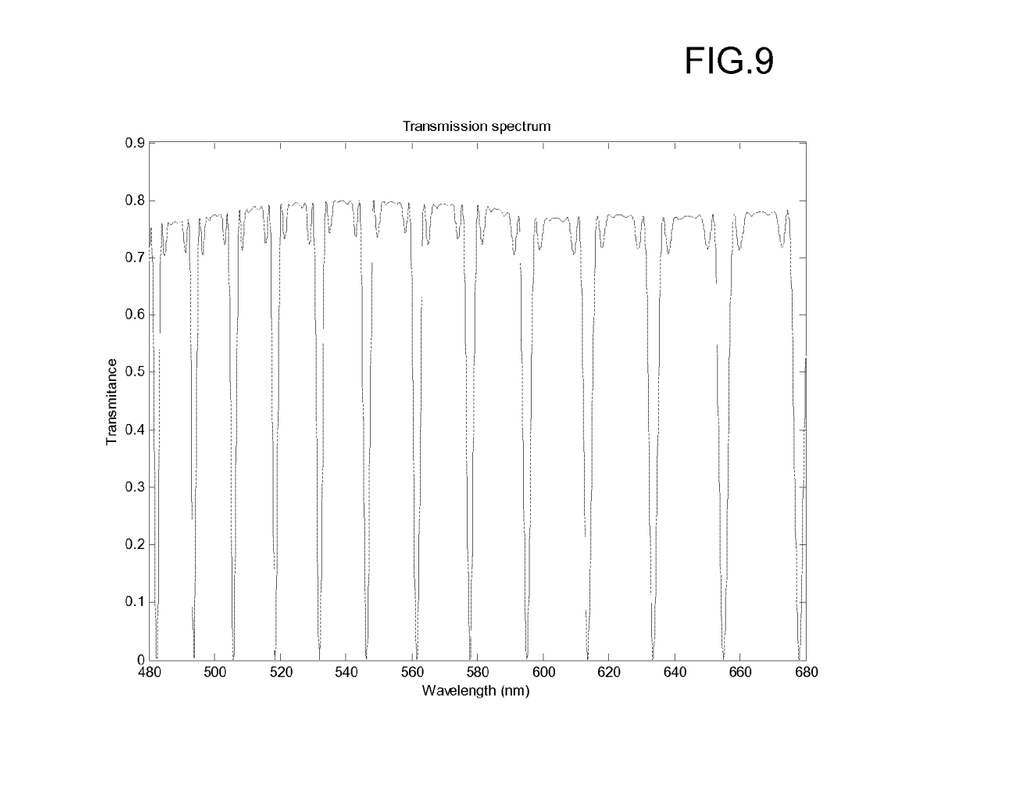
FIG. 9 is a transmission spectrum corresponding to FIG. 8.

FIGS. 4-9 demonstrate that the birefringence stack of paired fixed and tunable retarders can be embodied in any of several specific configurations including the Lyot type, Solc and Evans types. However unlike known configurations, the embodiments shown are configured as band-stop filters. An Evans filter configuration, for example as shown in FIG. 4 and having a transmission function as shown in FIG. 5, has a succession of birefringent retarders with integer multiple thicknesses (d, 2d, 4d, 8d, etc.). FIG. 6 shows a Salman Saeed, Philip J. Bos, spatially addressable polarization interference filter configuration. See, J. Opt Soc. Am A, Volume 19, Issue 11, 2301-2312 (2002), except that the filter is configured for band-stop operation according to the present disclosure and has a transmission spectrum as shown in FIG. 7. A Solc folded filter configuration is shown in FIG. 8 (see also the transmission spectrum in FIGS. 9) and has equal thickness birefringent elements in a filter stack. The birefringent elements realign the polarization state and orientation of the discrimination wavelength with respect to the alignment of the selection polarizer 27 at the output of the stack. A Solc filter can be of the "fan" type or as a "folded" type. (The angles of the folded type are sometimes termed the "rocking" angles.) Each type advantageously has an input polarizer and an output polarizer that define a relative rotational angle between them (for example, they may be optically parallel or perpendicular or at 45° or another predetermined angle). The stacked pairs of birefringent elements 31, 32 are placed at angles whereby the pairs each contribute to an incremental change in polarization state, especially incremental twisting of a plane polarization orientation, to match the rotational displacement span between of the input and output polarizers 25, 27. For a Solc fan or folded filter, the relative angle is calculated by $2\phi$, $\phi=180/(4N)$, and N is the number of retarders. Thus, for FIG. 8, where N=8, the director orientations of the stacked birefringent elements would be rocked at an angle $\phi=\pm5.625°$, or advanced $+11.25°$ relative to the orientation of the previous element.

The present subject matter is apt for a generalized multiconjugate filter type configuration that fits any of the foregoing descriptions. Unlike the known type of filter configurations, however, the inventive filter is configured such that the discrimination band is blocked at the output selection filter. In the examples, the discrimination band is presented at a polarization orientation that is orthogonal to the orientation of an output polarizing filter 27. Whereas there is no vector component of the discrimination band that is parallel to the optical axis of the output polarizer, the discrimination band does not pass the output polarizer. Thus, the filter acts as a band stop filter.

In different respective configurations comprising a fixed retarder 31 and a liquid crystal tunable retarder 32 as described, all the liquid crystal retarders can be of the same thickness X, whereas all the fixed retarders are of the same thickness Y, but X and Y are different. The liquid crystal retarders can be of a same thickness, whereas the paired retarders are maintained to have the required thicknesses for the configuration, such as a 1:2:1 total thickness ratio in an Evans filter configuration, i.e., the first and third fixed retarders have the same thickness whereas the sandwiched middle retarder is twice the thickness of the first and third ones, and the middle liquid crystal retarder can be tuned to twice the birefringence of the outer two liquid crystals. Various embodiments may be designed with different angles of orientation for the retarders, the angle being determined by the orientation of the discriminating filter (e.g., the output polarizer 27). As discussed the discriminating filter is oriented to stop the selected preferably-narrow discrimination band.

The angular span between the input and output polarizers can be set up to any desired angle and any number of iterated pairs 31, 32, sized and rotationally oriented to present the output discrimination band in an orientation that will be blocked by the output polarizer. It is convenient to arrange the respective elements at increments of 45° of rotational orientation to equally divide the light energy at zero° or at increments of 90° by a vector division. It is also convenient to arrange one or more output polarizers to correspond to phase retardations of increments of 90° (i.e., $\pi/2$ radians), because a polarizer is aligned to a given reference angle at either zero or 180° and is orthogonal at either 90° or 270°. Accordingly, a middle pair 31, 32 as in FIG. 4 may be at 90° to the input, and the first and third pair may be at 45° and 135°, respectively.

Figure 10:
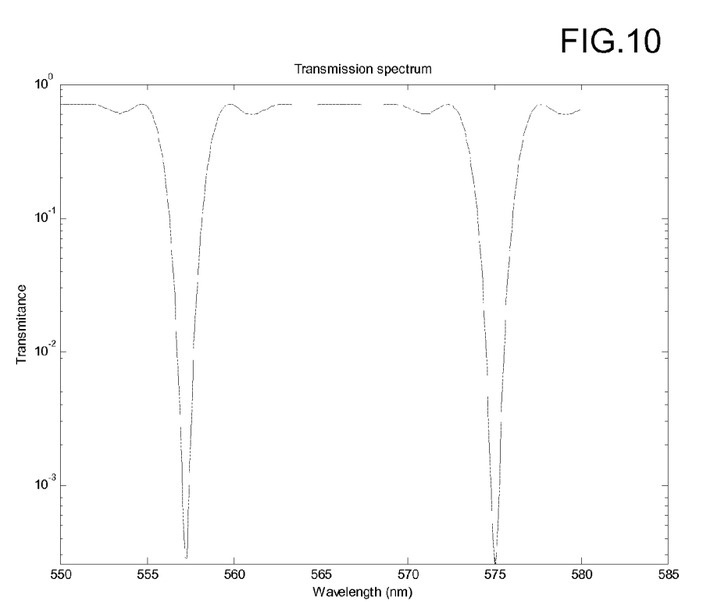
FIG. 10 is a logarithmic plot of a transmission spectrum useful in a band-stop application.

FIG. 10 depicts a detailed stop band in the transmission spectrum of an exemplary filter designed according to the present disclosure to provide a tunable band stop characteristic. It is seen from the plot in FIG. 10 that the rejection ratio can be very high, as evidenced by the deep rejection notches in the logarithmic plot shown. The filter is also advantageously discriminating in that the attenuation is low and constant at a span away from the center rejection wavelengths (approximately 557.5 nm and 575.0 nm in the example). That is, the rejection or band-stop action is quite sharp at the desired wavelengths and there is almost no rejection or blocking at other wavelengths. The non-rejected wavelengths are transmitted through at a high transmission ratio (low attenuation).

These characteristics are such that apparatus that may benefit from a sharp band stop action are useful applications of the present disclosure. In imaging applications it may be useful to mask a particular wavelength band in order to reduce that total received light amplitude so that wavelengths apart from the masked band have a better degree of contrast.

Figure 11:
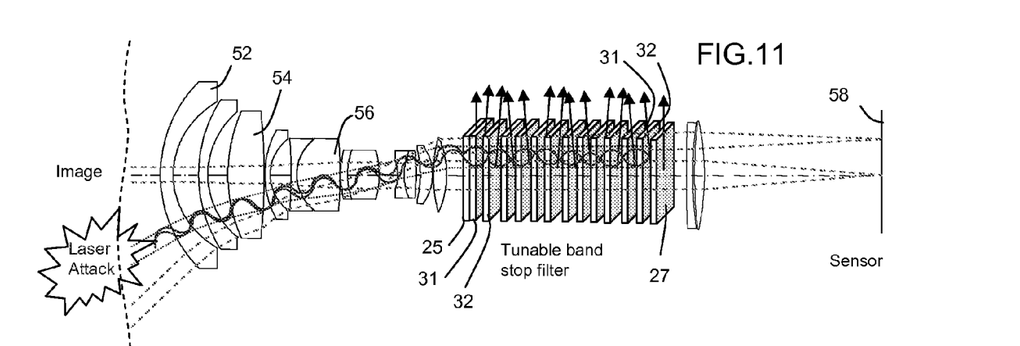
FIG. 11 is a schematic diagram showing an exemplary practical application, namely an imaging system subject to laser attack, protected by the band-stop filter of the present disclosure.

FIG. 11 illustrates a defensive tactical application, namely as a tunable band-stop filter to block enemy light rays from affecting optical sensors/devices, such as tactical imaging systems (potentially using outgoing illumination as well as incoming sensing), target marking and seeking, and other similar systems. It is assumed that the enemy's countermeasures could include targeted or scanned laser radiation emitted in an effort to blind and disable the system by overdriving or damaging its light sensors. Some desirable characteristics of a band-stop filter for such an application might include rejection of a laser wavelength at a high rejection ratio (at least $10^4$ to 1), maintaining useful light throughput for other wavelengths as necessary to continue to operate the system while defending against laser countermeasures, and an ability to tune the stop band at least for tuning the discrimination band to block an enemy wavelength. The present filter is readily controlled electrically and thus can be tuned quickly to the wavelength of an attacking laser source. One option is to use the received light amplitude as a negative feedback input signal for a control circuit (not shown) by which the band stop wavelength is adjusted to a wavelength that most effectively blocks the amplitude of radiation transmitted through the filter.

The filter should be inexpensive, easy to manufacture, stable, and have a long life. In an imaging application, attention is needed to the width of the field of view for incoming light, particularly because the thicknesses of the birefringent elements along a propagating light path that is inclined (e.g., originating near the edges of the field of view) is greater than their thickness along a precisely normal path (at the center of the field of view). In some cases, the filter should be tunable to reject two different laser wavelengths, potentially with closely adjacent center wavelengths. In some cases, an extremely high rejection ratio (at least $10^6$ to 1) is desirable or may be useful if selectively enabled. An ability to selectively reject a wide wavelength range (e.g., 400 to 700 nm, or 700 to 1200 nm, or 1000 to 2400 nm), at least at a lower rejection ratio, might be useful together with an ability to switch into a higher rejection ratio in a narrow rejection band (e.g., 10 nm to 0.1 η range, Full Width at Half Maximum- FWHM).

Figure 12:
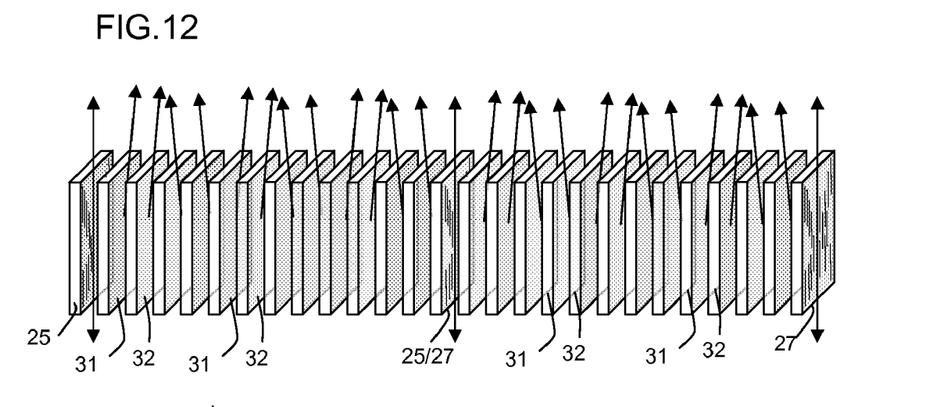
FIG. 12 illustrates a cascade of band-stop filter stages according to the present disclosure, wherein the intermediate polarizer functions as an output selector for the first stage and an input polarization state filter for the second stage.
Figure 13:
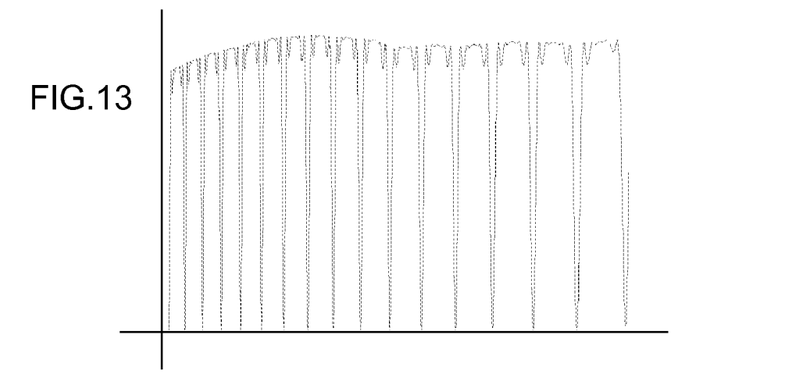
FIG. 13 illustrates the transmission spectrum of the filter of FIG. 12 with the stages tuned to overlap.
Figure 14:
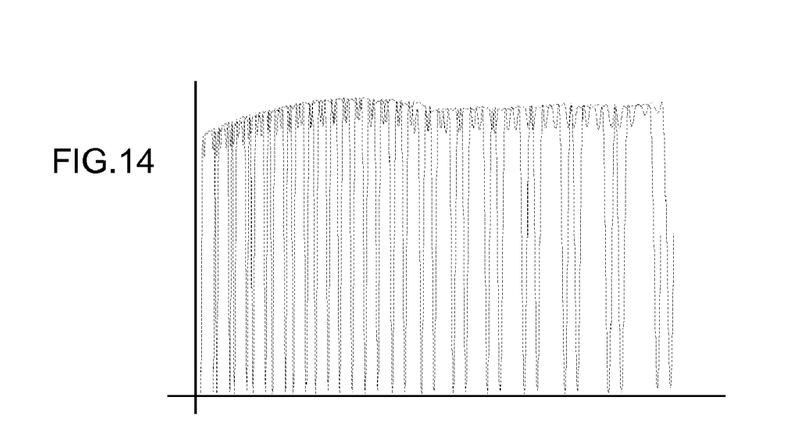
FIG. 14 illustrates the transmission spectrum of the filter of FIG. 12 with the stages tuned slightly differently to provide a multiple notch stop band characteristic, or if closely tuned, a technique for adjusting the bandwidth of the stop band.
Figure 15:
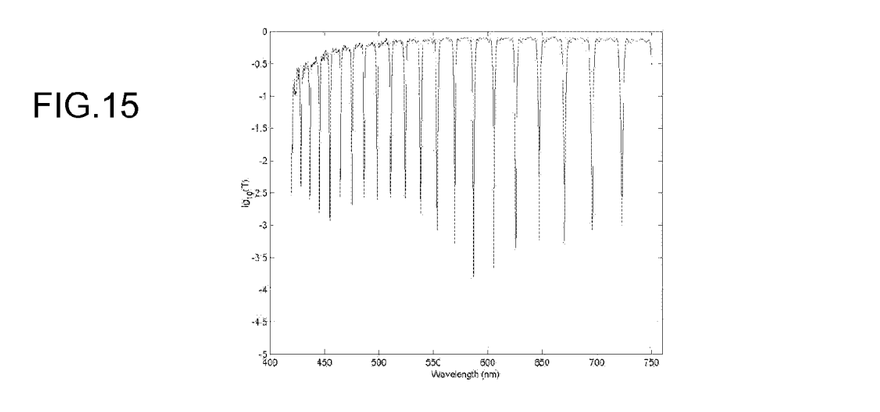
FIGS. 15 and 16 respectively show the transmission spectra that are obtained by tuning respective two and three stage filters to the same stop bands.
Figure 16:
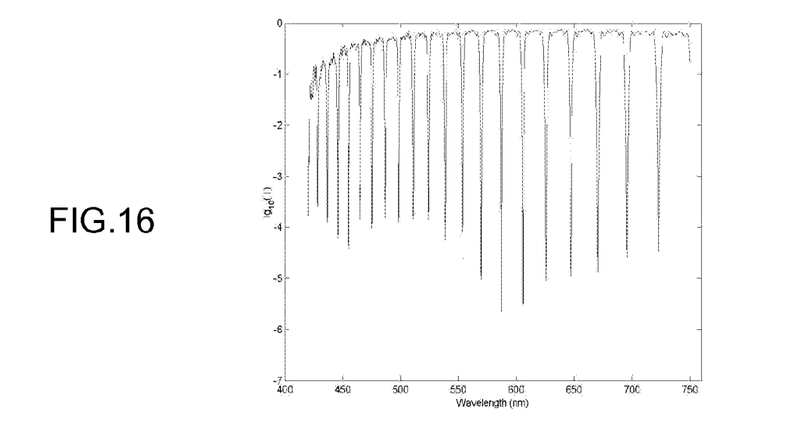

A number of these attributes are provided by the present filter, with a tunable discrimination band provided in one stage as described, or in two or more stages as in FIG. 12, tunable to a same stop band as in FIG. 13 with high discrimination, or to different stop bands or wider stop bands as in FIG. 14. FIGS. 13 and 14 show two tuning states of a multi-stage filter wherein the comb filter notched transmission characteristics as shown can be overlapped (FIG. 13) or not (FIG. 14) with the results shown. FIG. 15 shows the rejection ratio possible with two cascaded band-stop filters, shown in FIG. 12. FIG. 16 shows the rejection ratio possible with three cascaded band-stop filters configured in the same way as the two stages shown in FIG. 12. Of course, the other configurations as shown in FIG. 4, 6, or 8, for example, could also be cascaded.

In the embodiment of FIG. 11, it may be desirable that the filter reflect all rejected wavelengths at least at the output polarizer, to prevent overheating during defensive rejection of certain wavelengths, under high powered laser attack. The filter may be polarization independent and fast tuning and is disposed along a light transmission path with a system of lenses 52, 54, 56. In the example shown, the lens arrangement is provided to focus an image onto a light sensor 58, shown generally. The light sensor may be a two dimensional charge coupled device (CCD) array, a line of CCD elements with an associated scanning arrangement (not show) or similar arrangement.

Figure 17:
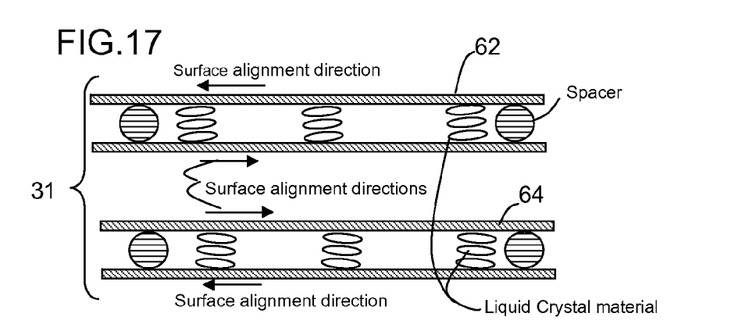
FIG. 17 is a schematic diagram showing a technique for increasing the effective band-stop field of view, for example in an imaging application as in FIG. 11.

In connection with the field of view issue, the foregoing embodiments have been discussed with an expectation that the light propagation path is substantially normal to the plane of the birefringent element pairs 31, 32, due to the lenses 52, 54, 56. That is, the propagating light is incident at zero degrees relative to the center axis of the filter and perpendicular to the surface of the light receiving polarizer as well as the birefringent elements 31, 32. It is apparent from FIG. 11, however that in an imaging application there is some angular offset from a normal angle of incidence. The imaging lens arrangements refract and collimate the light from the image field to the light sensor arrangements. However, a ±2° to ±4° variation from normal (for example) may still be expected due to variations in the location of a point source in the image field. This variation can be tolerated by configuring the filter as shown in FIG. 17.

To accommodate light at off axis incidence, the lens system 52, 54, 56 brings the incident light angle close to zero degrees). In lieu of or in addition to lenses, as shown in FIG. 17, the range of incident field of view may be expanded by stacking two liquid crystal elements in the liquid crystal retarders 31. The top element liquid crystal molecules are aligned to rubbing directions on glass or other plate supports, in known manner. However the rubbing directions 62 are arranged in successive liquid crystal cells such that the rubbing direction 62 of the upper one as shown, is parallel to the glass rubbing for the bottom one but in the opposite direction. This is shown by the labeled surface alignment directions 62 in FIG. 17.

The band-stop liquid crystal tunable filter (LCTF) according to the present disclosure is tunable over a large spectral range by adjusting to move a stop band in the filter transmission spectrum to correspond to a desired stop band. Tuning adjusts the periodic sequence of stop bands, generally compressing or expanding the arrangement of peaks and notches over a span of wavelengths.

The inventive LCTF has a high rejection ratio (polarizer limited), which can be made quite high (on the order of $10^{-6}$) by cascading similar filters and adding an additional polarizer. In the case of cascaded filters, for example as shown in FIG. 12, the cascaded filter stages can be tuned in unison, to improve the rejection ratio at the notches as shown in FIG. 13, or the filter stages can be adjusted independently, for example to cause the cascaded filter transmission function to have adjacent stop bands that abut or slightly overlap as in FIG. 14.

The inventive band stop liquid crystal tunable filter (LCTF) is somewhat thicker than a thin film type, but can be configured to stop a very narrow bandwidth (100 to 0.1 nm FWHM).

The inventive band stop filter can process randomly polarized light without an input polarizer. With an input polarizer 25 as shown in FIG. 1, it is necessary to provide an input signal with at least a component of the propagating light that is parallel to the input polarizer. Polarization independence is possible by providing two orthogonal polarizers arranged to split and recombine orthogonal polarization components in an input light signal, so as to align the light signal at 45° to the fast and slow axes 44, 45 of the first birefringent element in the signal path.

The disclosed filter in one embodiment can achieve fast tuning by using one or more of a π-cell, having a 1 to 10 ms response time, a polymer-stabilized (PS)-π-cell, having 0.5 to 3 ms response time, and/or a stressed liquid crystal cell, having a 0.1 to 3 ms response time for the liquid crystal retarder elements 32. The surface alignment directions (unlike the embodiment shown in FIG. 17) need to be in the same direction in a π-cell liquid crystal arrangement because a same rubbing direction of two glass surfaces results in the "π" degree of orientation for the internal liquid crystal material.

The inventive filter can be produced at modest cost. In one embodiment, the tunability of the filter is such that the dimensions of the fixed and variable retarders 31, 32 are not critical, provided that the retarders in the successive pairs have the same thicknesses.

The filter can serve a relatively large field of view (plus or minus 3 to 10 degrees) with reasonably good results, particularly if imaging optics provide some collimation at the stacked retarders 31, 32.

In embodiments intended for defensive use of the filter to block high energy light signals, a reflective polarizer may be desirable at the output or selector polarizer 27, rather than an absorptive polarizer. Wire grid polarizers are useful examples of reflective polarizers, e.g., as manufactured by Moxtek, Inc., of Orem, Utah. A wire grid or similar reflective polarizer can reduce the potential of damage to the filter by overheating when tuned to reject high intensity light.

In one embodiment, a Moxtek aluminum wire grid polarizer was used as the selection polarizer 27. In different optical configurations, this type of polarizer can be oriented to reflect rejected light to an orientation that is chosen for various purposes. Zero degree and 45 degree wire polarizer versions are available from Moxtek. A polarizer that reflects laterally (45°) can direct rejected light into a light sensing path (not shown) leading to a photocell (not shown) having an output that is coupled to a feedback control system to tune the filter so as to seek to maximize the rejected light intensity when under attack. Alternatively, directing the rejection light in a particular direction may be desirable to make the device compact, in which case the wire grid might be put on a surface relief structure.

To improve the band stop characteristics, in particular the rejection ratio, a number of birefringent elements can be placed sequentially along the light path. Provided that the size and rotational orientation of the birefringent elements is correct in the sequence, the output at the last element need not be parallel or perpendicular to the selection polarizer at the input (i.e., the respective elements 31, 32 can be configured for other angles). All that is needed is for the output selection polarizer to be orthogonal (perpendicular) to the polarization of the emerging light at the stop band wavelength. Therefore, the precise number of pairs 31, 32 and the orientation of the selection polarizers is in part a choice dictated by the desirer rejection ratio.

Each of the birefringent elements is rotationally aligned to complement the polarization orientation of light at the stop band wavelength, emerging from the next previous birefringent element. The angles might progress in one direction in a helical twist, or might rock in opposite directions relative to a reference, but the point is that the successive elements are aligned to correspond to the given wavelength only. Light at other wavelengths is not excluded, but does not experience the same polarization state shift that characterizes the progress of the stop band. Therefore, out-of-band light may be polarized randomly by the filter.

The disclosed band-stop filter has a series of stop bands that are periodically related. It is not desirable to have other stop bands, apart from the desired stop band, because these other stop bands eliminate light that might be useful to an imaging apparatus or the like. However, the comb filter stop band spectrum is such that light is transmitted over a substantial part of the spectrum outside of the stop band notches (see the characteristic transmission functions in FIGS. 9 or 13, for example).

The subject band stop filter can be embodied in any of the various birefringent element filter configurations that use interference and polarization techniques. Some examples are the Lyot, Lyot-Ohman, Solc and Evans birefringence filters. As discussed at length, in the disclosed arrangement, the selection polarizer 27 is placed orthogonally to the orientation of the discrimination band to which the birefringences, thicknesses and orientations of the retarders 31, 32 are set. In other respects, the disclosed technique can exploit the precision and selectiveness of these filter techniques in providing a discrimination wavelength that is rendered distinct from other wavelengths such that in-band and out-of-band wavelengths are distinguished with a high degree of discrimination.

A basic Lyot filter can comprise a number of filter stages placed successively along a light path. (See, Yariv, A. and Yeh, P. (1984) Optical Waves in Crystals, Chapter 5, John Wiley and Sons, New York). Each stage has a birefringent crystal element (a retarder) between parallel polarizers. According to the present development, intermediate polarizers can be omitted because the object is to stop only a selected discrimination band. Alternatively multiple stages as in FIG. 12 can be cascaded with the band-stop spectrum of one multiplied by the band-stop spectrum of the other. The intermediate polarizer(s) and the exit polarizer serve to eliminate the discrimination band, namely that band that by operation of the successive retarders 31, 32 has been provided with a polarization state that is different from other wavelength bands and is precisely oriented for exclusion at the selector polarizer 27.

Certain filter configurations have retarders with optical axes rotated 45° to the output orientation of the preceding element, thus dividing the light from the input polarizer into two components divided equally between the fast and slow axes of the birefringent crystal. For example, the embodiment of FIG. 4 has the orientation of the first retarders 31, 32 at 45° to the input polarizer. In propagating through the crystal, the component on the slow axis becomes retarded relative to the component on the fast axis. The polarization orientation of the light is altered as well. At the output, the exit polarizer in this embodiment is oriented at 135 degrees to the preceding crystal retains equal proportions of the retarded and the un-retarded components, but blocks wavelengths for which the angular polarization change through the crystal causes the wavelengths to emerge orthogonal to the exit polarizer.

A filter can have a repetitive layout of crystals between polarizers, each the crystals and their polarizers being relatively aligned at 45 degrees, as described. Phase differences are introduced in part because the thickness of each stacked birefringent crystal elements is different. The thickness and the birefringence of each retarder element 31, 32 contribute to required phase retardation at the discrimination wavelength as necessary to align the polarization state of the discrimination wavelength to the next retarder, and ultimately to produce an output wherein the discrimination wavelength is orthogonal to the selection polarizer 27 and is blocked.

The successively varying stage thicknesses are selected (e.g., equal thicknesses or 1d, 2d, 4d, 8d, etc., or another relationship according to the filter configuration type) with regard to the relative rotational alignment of the successive stages, so as to provide an arithmetic, geometric or other mathematical progression. The operation of the stages can be modeled mathematically and tested empirically. Multiple stage crystal devices have been demonstrated with 0.1 angstrom resolution (Title, A. M. and Rosenberg, W. J. Opt. Eng. 20, 815 (1981) ). In order to achieve such resolution, dimensional precision is necessary, which makes the filters expensive. Often, resolution is improved simply by adding to the number of successive cells, sometimes using a large number of successive cells. This may reduce the proportion of light that is transmitted versus the proportion that is rejected. Such filters are suited for astronomical applications wherein the filters are tuned to specific lines of the solar spectrum, where the source, like the Sun, is very bright. In the tunable embodiments that are the subject of this disclosure, it is the sum of the birefringences of the fixed and variable retarders 31, 32, aligned to one another in each retarder element, that determine the retardation of the vector components of the light. The tunable elements are adjusted as a set such that the effect is to adjust the birefringence of all the retarder pairs 31, 32 in the filter, thus tuning in a manner that is much the same as changing the thicknesses of all the member of a set of fixed birefringent crystals.

Evan, Lyot and Solc stacked crystal filter configurations are discussed herein by way of examples. These filter configurations are known for bandpass applications, but according to the present disclosure are modified by the orientation of the selection polarizer 27 to function as a band stop device. Some configurations (e.g., the Solc filter configuration) can be stacked without using a polarizer between retarder pairs, or optionally between retarder stacked stages (FIG. 12, for example, has a retarder between stages). Some configurations have retarder pairs 31, 32 with different summed thicknesses. These differences may be accommodated according to the present disclosure, in each instance being able to produce a distinctly polarized discrimination band, for example a plane polarized band, orthogonal to the selection polarizer so as to be stopped from transmission.

The relative rotational angles between each birefringent crystal and the next preceding or succeeding crystal in a Solc configuration represent fractions of the rotation angle between the entrance polarizer and the angle that is orthogonal to the selection polarizer. The Solc "fan" filter configuration (FIG. 6) can have N identical crystals with rotation angles of $\theta$, $3\theta$, $5\theta$... $(2N-1)\theta$, located between perpendicular polarizers where $\theta=\pi/4N$, and N is the number of crystals in the stack. Thus, Solc fan angles are progressively more rotated in a same direction. The Solc "folded" configuration has N identical crystals oriented at $\pm\theta$ with respect to the incoming polarization where $\theta$ is the angle which the optic axis the crystal makes with the transmission axis of the entrance polarizer. The folded design has alternating orientations and uses crossed polarizers, but otherwise operates in the same way as a fan configuration to orient the polarization state of the selected bandwidth so as to conflict with the exit polarizer and stop the tuned wavelength bands. Among other varieties of recognized Solc configurations are the Solc Gaussian and Solc sinc configurations.

For example, a Solc "fan" arrangement might have four retardation elements and perpendicular polarizers. In such a Solc "fan" arrangement of four crystals (N=4), the first crystal is rotated 11.25 degrees relative to an input polarizer. The successive crystals are rotated by 22.5 degrees relative to the next preceding crystal. The output or analyzer polarizer is perpendicular to the entrance polarizer. A four retarder Solc "folded" arrangement by comparison has four stacked crystals placed alternately at clockwise and counterclockwise rotation angles relative to the polarizer, such as +11.25 degrees, −11.25,+11.25, and so on, and the analyzer polarizer is perpendicular to the entrance polarizer. Other variants are possible with different values for N, $\theta$ and the orientation of the polarizers.

In the multiple-retarder configurations of the foregoing types, each has its own characteristics and filter properties. In a Solc configuration, for example, the crystals are all of the same thickness. Equal retarder stages may be less expensive and more easily manufactured than coordinated varying thicknesses. A larger number of stages will fit in a longitudinally shorter stack than in a Lyot configuration with progressively varying thicknesses. A Solc configuration uses relatively fewer polarizers than some of the alternatives.

However there are applications in which a wavelength band-stop filter that is as highly discriminating as a band-pass filter, as described, can be very useful. A band-stop filter may be defensive, for example to permit an optical apparatus to continue to operate when under attack by application of narrow band light, such as laser light. Another application could be to mask directly reflected coherent light applied to illuminate a sample so as to improve the reception of other wavelengths emitted from the sample. In the present disclosure, the application of a band-stop filter to defensive applications is discussed as a nonlimiting example.

Holographic Polymer Dispersed Liquid Crystal (PDLC) filters are a form of known band-stop device. PDLC filters do not have a very long lifetime. Such filters do not rely on polarization and typically have a polarization independent bandwidth of 10 to 50 nm. The PDLC filter type suffers from scattering problems.

PDLC filters can be tunable slightly, but have a small field of view. Although tuning of such filters may be relatively fast, the rejection ratio (in a band-stop application) is low, for example 10:1 to 100:1.

PDLC filters may be configured to reject two wavelengths, such as the wavelengths of two lasers, but the performance of such filters is substantially deteriorated if so applied.

Traditional interference filters may be designed with a high rejection ratio and excellent quality. Such filters may also reflect at particular rejection wavelengths. However, traditional interference filters are not tunable.

According to the present disclosure, transmission functions of serially disposed filters apply progressively to the passing light signal. The transfer functions multiply. The finesse ratio of the overall multi-stage filter is the mathematical product of the finesse ratios of the stages. In a band pass configuration, the multiplication of transfer functions tends to improve the finesse of a filter by operating at the same time to increase the rejection ratio where pass bands of multiple stages overlap, and to increase the free spectral range between passbands because non-overlapping pass bands of multiple stages are canceled by the transmission spectra of the other stage(s). In the present band stop band application, a stop band at any of the stages removes that wavelength component. Therefore the stop band rejection ratio at overlapping bands is increased by cascading, but the free spectral range and therefore the filter finesse are reduced.

In some configurations, the liquid crystal cells used for the filter comprise electrically controlled birefringence (ECB) liquid crystal cells with anti-parallel rubbing on the top and bottom substrate to establish the orientation of the molecules. Among other possible liquid crystal modes and examples are vertically aligned nematic liquid crystal cells, $\pi$-cells, OCB cells and bend cells. In the anti-parallel case, two of the liquid crystal cells can be double stacked with each other to achieve better viewing angle characteristics.

It is possible to employ a lithium niobate ($LiNO_3$) material for the fixed retarder. Preferably, the retarders comprise bromium borate (BBO), so as to be approximately index matched to glass and/or used as a supporting plate of the liquid crystal structure.

The liquid crystal 31 and the fixed retarder 32 in each pair preferably are substantially optically matched. For this purpose the fixed retarder advantageously comprises bromium borate. This material has an optical index of about 1.5 to 1.7 in the visible wavelength range, which is similar to the index of glass. By using a retarder with an optical index similar to glass, anti-reflective coating is not required while reducing reflections at an interface between the retarder and a glass plate. If the optical index is mismatched at such an interface, reflections can occur at the interfaces.

Other birefringence materials such as $LiNO_3$ have a higher index (e.g., 2.0 or 2.1) and are applicable to the present subject matter, but may benefit from an anti-reflective coating or the like at the abutment of respective retarder elements. Other birefringence materials such as calcite crystals may be chosen that are more closely matched to glass than $LiNO_3$. Some materials may be preferred or not preferred due to particular characteristics and/or manufacturing challenges. Whereas birefringent materials have a different optical index along different axes, the index is matched only approximately with abutting isotropic materials such as glass. An approximate index match reduces reflections.

Referring for example to the rocking angle configurations in FIGS. 8, 11, 12 the retarders (preferably including tunable birefringent elements) are required to be equal in dimensions if arrangements otherwise are made to provide equal birefringences. The rocking angle and the thickness of the retarder follow a particular relationship. Assuming that the rocking angle and the thickness of the $k^{th}$ retarder element is $\phi_k$ and $d_k$, the rocking angle and the thickness of the $k+1^{th}$ retarder element is $\phi_{k+1}$ and $d_{k+1}$, where k=1, 3, 5, 7, 9, 11 . . .

The generalized multi-conjugate filter stage could have the rocking angle and thickness of:

$\phi_k = m\phi, \phi_{k+1} = n\phi$ $d_k = md, d_{k+1} = nd$ where m=1, 2, 3, 4 . . . n=1, 2, 3, 4 . . .

$0.7° < \phi < 11.25°$ 0.5 µm<d<5000 µm.

An example of this arrangement is represented by the following table.

| Retarder Number | Rocking angle | Thickness "d" of the retarder |
|---|---|---|
| 1 | 7.5° | 1000 µm |
| 2 | −22.5° | 3000 µm |
| 3 | 7.5° | 1000 µm |
| 4 | −22.5° | 3000 µm |
| 5 | 7.5° | 1000 µm |
| 6 | −22.5° | 3000 µm |

The embodiment of FIG. 12 is such that the thickness of the birefringent retarders is the same. In a stage, the thickness of the $k^{th}$ retarder element is "d" and the rocking angle of the $k^{th}$ retarder element is $\phi_k$. The rocking angle can progress according to a Gaussian function, a triangular function, a sinusoidal function, sinc square function, etc. Characteristic rocking angle progressions that can be employed are disclosed in Salman Saeed, Philip J. Bos, "Multispectrum, spatially addressable polarization interference filter," JOSA A, Volume 19, Issue 11, 2301-2312, which is hereby incorporated for such teachings. An example of a suitable progression is shown in the following table and its transmission spectrum is shown in FIG. 15.

| Retarder No. | Rocking angle $\phi$ | Thickness "d" |
|---|---|---|
| 1 | 0.47° | 1000 µm |
| 2 | 3.1° | 1000 µm |
| 3 | 12.5° | 1000 µm |
| 4 | 32.3° | 1000 µm |
| 5 | 57.7° | 1000 µm |
| 6 | 77.5° | 1000 µm |
| 7 | 86.9° | 1000 µm |
| 8 | 89.53° | 1000 µm |

In another generalized arrangement wherein the thickness of retarder element is always "d," the rocking angle of the $k^{th}$ retarder element $\phi_k$ can proceed as in the optimized computer simulation described in Gal Shabtay, Eran Eidinger, Zeev Zalevsky et al. "Tunable birefringent filters-optimal iterative design," Appl. Opt., Vol. 36, No. 1, 1997, pp 291, also hereby incorporated for that progression.

The embodiment of FIG. 12 has equal retarder thicknesses, although in this example the retarders are shown as stacks of plural elements. The thickness of each retarder is "d." The rocking angle of the $k^{th}$ retarder element is $\phi_k$. The number of repeating retarders of the same thickness and rocking angle is "M." Therefore, $\phi_k = (-1) \text{mod}(k, M)\phi$ $d_k = d$ $\phi = M * 180°/(4k)$ Here mod(k, M) is the modular function In the described embodiments wherein the cooperating retarders include one or more stages having retarder elements that are wholly or partly fixed retarders abutted with controllable liquid crystals, use of an index matched fixed retarder material such as bromium borate maintains the high transmission ratio for light out of the rejection band. Other retarder materials are also possible and unless index matched can be provided with antireflection coatings. Possible fixed retarder materials include, for example: Barium Borate (BBO, α-BBO) ($n_e$=1.5534, $n_o$=1.6776); Quartz; Calcite; Yttrium Vanadate ($YVO_4$); $LiNO_3$; $MgF_2$; Potassium Niobate Crystal ($KNbO_3$); etc.

The operational wavelength region of the filter may dictate the material of the polarizers used in the filter. Polarizers generally are optimal over a limited wavelength range. The fixed retarder and the liquid crystal material generally have high transmission in a very wide range of wavelength spectrum. However, the transmission spectrum of the polarizer may be limited, e.g., to the ultraviolet, visual, near infrared, short or medium wavelength infrared, etc. By selecting different types of polarizers, the filter can operate in the corresponding wavelength region. An exemplary visual spectrum polarizer can be NITTO DENKO's NPF series of polarizing film. Edmund Optics carries high contrast ultraviolet (UV) and near infrared (NIR) polarizers that can cover 365 nm to about 1700 nm. ColorPol series UV to NIR polarizers from CODIXX can cover the 350 to 2500 nm wavelength region. These elements are advantageous for many hyperspectral imaging applications that require collection of optical signal in wide wavelength spectra.

This disclosure presents various examples, choices and modifications that are possible in light of the above teachings. It should be understood that these are intended as illustrative as opposed to limiting. Reference should be made to the appended claims to assess the scope of the subject matter in which exclusive rights are claimed.

What is claimed is:

1. A spectral band stop filter, comprising:
at least one selection polarizer and a plurality of tunable birefringence elements coupled along a signal propagation path leading from an input up to the selection polarizer,
wherein each of the birefringence elements in the plurality has a birefringence and a rotational orientation that complements a respective birefringence and rotational orientation of the remaining birefringence elements in said plurality, in that each of the birefringence elements contributes part of a change in a polarization state between the input and the selection polarizer for a set of periodically related wavelengths, thereby imparting a predetermined polarization orientation to a component with a given orientation at the input and a wavelength in the set of periodically related wavelengths, said predetermined polarization orientation being different from an orientation of other wavelengths;
wherein the selection polarizer is oriented orthogonal to said predetermined polarization orientation, thereby blocking transmission of a band discrimination wavelength at the selection polarizer and permitting the other wavelengths to be transmitted by the selection polarizer; and, further comprising a control operable to tune the birefringence elements so as to adjust the set of periodically related wavelengths, such that the band discrimination wavelength is tunable by causing one of the periodically related wavelengths to correspond to a selected wavelength to be blocked.

2. The spectral band stop filter of claim 1, further comprising an input polarizer, wherein the input polarizer is optically oriented at 45° to said first of said plurality of tunable birefringence elements along the signal propagation path, and the input polarizer determines said given orientation at the input.

3. The spectral band stop filter of claim 1, comprising at least two stages of said birefringence elements, wherein the birefringence elements in said stages are tunable in unison to the discrimination wavelength.

4. The spectral band stop filter of claim 3, further comprising at least one polarizer disposed between the stages.

5. The spectral band stop filter of claim 1, comprising at least two stages of said birefringence elements, wherein the birefringence elements in said stages are tunable independently and wherein a stop band of each of the stages is tunable to enlarge a bandwidth at the discrimination wavelength.

6. The spectral band stop filter of claim 1, comprising at least two stages of said birefringence elements, wherein the birefringence elements in said stages are tunable independently and wherein a stop band of each of the stages is tunable to provide at least two tunable band discrimination wavelengths.

7. The spectral band stop filter of claim 1, comprising at least two stages of said birefringence elements, wherein the birefringence elements in said stages are tunable in unison to the discrimination wavelength, wherein the tunable discrimination wavelength emerges from a last of the birefringence elements in a first stage at 45° orientation to fast and slow axes of a first of the birefringence elements in a next stage.

8. The spectral band stop filter of claim 7, further comprising at least one polarizer between the stages, optically oriented at 135° to said fast and slow axes.

9. The spectral band stop filter of claim 1, wherein the birefringence elements each comprise a pair with at least one fixed retarder and at least one tunable retarder, wherein fast and slow axes of the fixed and tunable retarders in the pair are rotationally aligned to one another to provide a birefringence for the pair that is determined by individual thicknesses and birefringences of the fixed and tunable retarders of said pair.

10. The spectral band stop filter of claim 9, wherein the tunable retarder comprises a liquid crystal tunable birefringence element.

11. The spectral band stop filter of claim 10, wherein the fixed retarder is index matched to at least one adjacent part of said filter.

12. The spectral band stop filter of claim 9, wherein the birefringence elements in at least one stage are configured as one of a Lyot configuration filter, Lyot-Ohman configuration filter, Solc configuration filter and Evans configuration filter.

13. The spectral band stop filter of claim 9, wherein the selection polarizer is substantially reflective.

14. The spectral band stop filter of claim 13, wherein the selection polarizer comprises a wire grid polarizer.

15. A spectral band stop filter, comprising:
at least one selection polarizer and at least two stages of birefringence elements, each of the stages comprising a plurality of tunable birefringence elements coupled along a signal propagation path leading up to the selection polarizer, wherein each of the birefringence elements in the plurality has a birefringence and a rotational orientation that complements a respective birefringence and rotational orientation of the remaining birefringence elements in said plurality, in that each of the birefringence elements contributes part of a change in a polarization state of a tunable band discrimination wavelength from a first of said plurality of birefringence elements up to the selection polarizer, wherein the tunable band discrimination wavelength emerges from the signal propagation path with a predetermined polarization orientation; and, wherein the selection polarizer is oriented orthogonal to said predetermined polarization orientation, whereby the tunable discrimination wavelength is stopped at the selection polarizer and other wavelengths substantially are transmitted; and, wherein the birefringence elements in said stages are tunable independently and wherein a stop band of each of the stages is tunable to overlap at the discrimination wavelength.

16. A method for wavelength filtering comprising:
placing a succession of controllable birefringence elements along a signal propagation path, and arranging a thickness, birefringence and rotational orientation of the birefringence elements to provide a set of periodically related wavelengths wherein a wavelength component of each of the periodically related wavelengths, having a predetermined polarization state at an input to the signal propagation path, emerges at an output of the signal propagation path at a distinct polarization state and distinct rotational orientation;

placing a selection filter at said output of the signal propagation path and configuring the selection filter orthogonal to the distinct polarization state and orientation, thereby blocking said signal components at said distinct polarization state; and, tuning the controllable birefringence elements to adjust the set of periodically related wavelengths over a range wherein one of the periodically related wavelengths is selectively caused to correspond to a selected wavelength that emerges at the output at the distinct polarization state and orientation, and therefore is blocked by the selection filter.

17. The method of claim 16, wherein the birefringence elements comprise pairs of fixed retarders and electrically controllable liquid crystals, and are placed such that fast and slow axes of the retarders and the liquid crystals are aligned with on another in each of said pairs.

18. The method of claim 16, wherein the distinct polarization state is plane polarization at a predetermined rotational orientation and the selection filter comprises a polarizer oriented orthogonal to said rotational orientation.

19. The method of claim 18, wherein the selection filter comprises a reflective polarizer configured to reflect said wavelength component, thereby stopping transmission thereof at the polarizer.

20. The method of claim 16, comprising configuring the birefringence elements in at least one stage configured as one of a Lyot, Lyot-Ohman, Solc and Evans configuration filter.

* * * * *